2,981,787

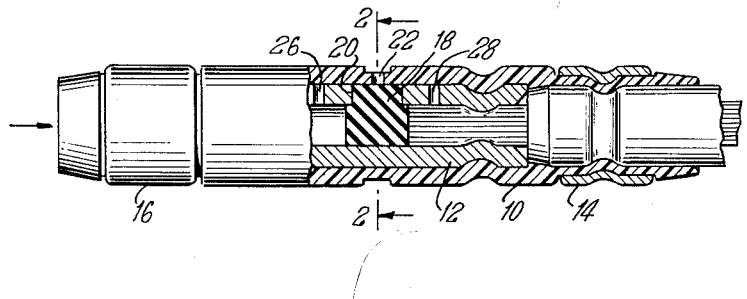
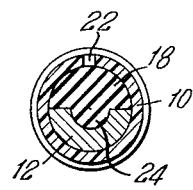
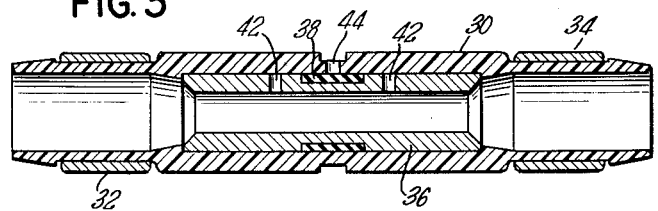
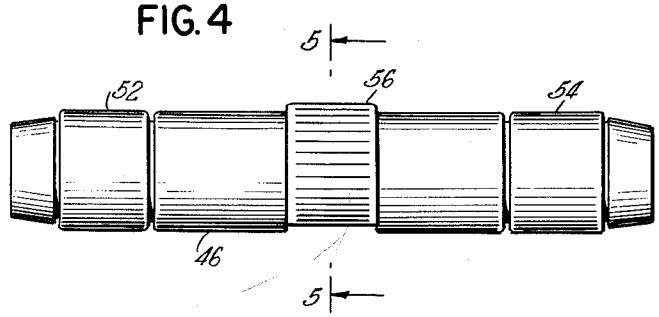
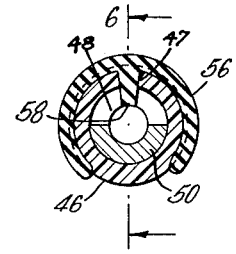
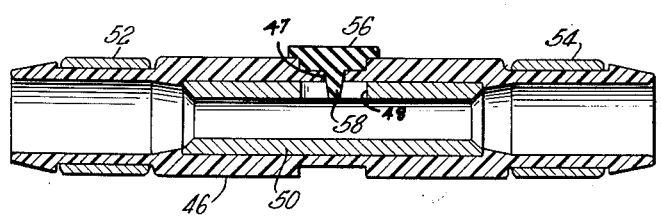
INVENTORS
John J. Brautigam
George E. Hood

United States Patent Office 2,981,787
Patented Apr. 25, 1961

INSULATED CONNECTOR

John J. Brautigam, South Norwalk, and George E. Hood, Stamford, Conn., assignors to Burndy Corporation, a corporation of New York Filed Feb. 7, 1958, Ser. No. 713,998

4 Claims. (Cl. 174—84)

This invention relates to insulated connectors for joining pairs of electrical conductors, and more particularly, to a waterproof insulated sealed connection which may be probed by a test prod and maintain its waterproof characteristics when the prod is removed.

In general, after a splice is made it is desirable to check the continuity of the electrical circuit. Hitherto, these continuity checks had to be made at test terminals or at specially provided test locations. It is, of course, recognized by all that it is advantageous to be able to test the continuity of an electrical circuit at the splice joint to insure that the splice is electrically sound and to further isolate any troubles in the circuit. The waterproof insulated splice of the prior art could not be probed or tested without destroying the connection seal and thus destroying the waterproof qualities of the splice.

One of the objects of our invention, therefore, is to provide a waterproof insulated splice through which access could be had for checking the circuit electrically.

Another object of our invention is to provide a waterproof insulated splice through which a needlepoint test prod can be connected and which will reseal itself when the test prod is removed to maintain the connection insulated and waterproof.

A further object of our invention is to provide an inexpensive, waterproof, probeable seal for a splice connection joining two insulated wires that may be mechanically coupled to the conductors, preferably with standard crimping tools and standard parts.

Still another object of our invention is to provide an electrical connection which is both insulated and waterproof and may be tested by the insertion of a needlepoint test prod without destroying the waterproof or insulation characteristics of the connection.

One of the features of our invention is a connector in which the conductors are placed within a sleeve of conducting material. An insulating sleeve is provided on the outside of the conducting sleeve to insulate the splice and sealing rings which are located on the ends of the assembly to maintain the splice waterproof. In the center, a probe hole is closed by a resilient insulating material having the ability to admit a test prod and being sufficiently resilient to reseal the probe hole after removal of the test prod.

These and other features and objects of our invention and the new results obtained therefrom will become more apparent from the following description and claims taken in conjunction with the accompanying drawing in which:

Fig. 1 is a side view in elevation, partly in cross section, of one embodiment of the probeable watertight insulated splice of our invention;

Fig. 2 is a view in cross section of the splice shown in Fig. 1 taken along the lines 2—2 of Fig. 1;

Fig. 3 is a view in elevation, in section, of an alternate embodiment of our invention;

Fig. 4 is a view in elevation of still another embodiment of the probeable waterproof splice of our invention;

Fig. 5 is a cross-sectional view taken along the lines 5—5 of Fig. 4; and

Fig. 6 is a view in cross section of the splice of Fig. 4 taken along the lines 6—6 of Fig. 5.

Referring to Figs. 1 and 2 of the drawing, the probeable insulated waterproof splice of our invention is therein shown to comprise a suitably sized piece of malleable metal tubing 12 into which electrical conductors may be inserted. The metal tubing 12 is located within a coaxially disposed insulating sleeve 10 made of a plastic material such as nylon which is preferably transparent. A pair of metal ferrules 14 and 16 are located over the insulation sleeve 10 at each end thereof.

A hole 20 is provided in the metal tubing 12 and a molded sealing insert 18, composed of a resilient material such as synthetic rubber or a resilient plastic, is inserted therein prior to assembly of the tubing 12 in the insulation 10. The molded sealing insert 18 has a section 24 which is inserted within the tubing 12 and acts as a cable stop.

After the tube 12 carrying the insert 18 is disposed within insulating sleeve 10, a probe hole 22 is drilled or punched in the sleeve 10. This probe hole 22 may, if desired, be provided prior to assembly, but then the orientation of the insulating sleeve 10 over the metal tube 12 would become more difficult. This probe hole 22 permits a needlepoint test prod (not shown) to be inserted into the splice through the molded sealing insert 18 to make contact with the lower portion of the metal tube 12. Due to the resilient characteristics of the insert 18, when the test prod is removed, the probed hole in the sealing insert 18 will reseal itself and the waterproof barrier remains intact against the entry of the moisture and foreign matter. Inspection holes 26 and 28 may be provided in the metal tube 12 for provisional inspection purposes to insure the proper location of the conductors in the tube 12.

In order to make the connection using the waterproof insulated splice of our invention, a pair of insulated wires have their conductor ends exposed. The exposed ends are inserted into the malleable tube 12 until they contact the cable stop 24 of the insert 18. When so located, a portion of the conductor insulation lies under the metal ferrules 14 and 16. After the conductors are inserted in the malleable tube 12, the tube 12 is crimped about each conductor making a good mechanical and electrical connection thereto. Moreover, the metal ferrules 14 and 16 are then crimped through the insulating sleeve 10 to the wire insulation. Due to the resilient characteristics or plastic memory of the insulating sleeve 10, it tends to flow under the metal ferrules 14 and 16, creating an extremely tight joint which is waterproof. The foregoing construction discloses a relatively simple and inexpensive connection forming a watertight seal over a splice using standard tools. There is no conducting path on the outside leading from one wire to the other, and the waterproof insulating splice utilizes a malleable tube 12 into which a molded sealing insert 18 of resilient material is placed which acts as a cable stop in addtion to providing the resealing of the probe hole.

Referring to Fig. 3 of the drawing, another embodiment of our invention is therein shown. In the embodiment shown in Fig. 3 only the insulating sleeve 30 has an opening 44 provided for probing. Disposed between the insulating sleeve 30 and the malleable tube 36 is a probe hole seal 38 which is located wthin a depression in the malleable tube 36. This seal may comprise a rubber-like band or it may be a liquid latex which solidifies on contact with air. When it is desired to probe the splice, it is merely necessary to insert a test prod through the probe hole seal 38 and make contact with the metal tube 36. When the prod is removed the self-sealing action of the probe seal 38 seals the path to the opening 44 in the insulating sleeve 30 from underneath.

Referring to Figs. 4, 5 and 6 of the drawing, an alternate embodiment of the waterproof insulated splice of our invention is therein shown to comprise a splice structure which is similar in many respects to the splice construction shown in Fig. 1, except that a snap ring 56 made of resilient material is provided, having a plug 58 which fits into the probe hole 47 of the insulating sleeve 46 and an opening 48 in malleable tube 50. In this construction, the malleable tube 50 may be slipped inside the insulating sleeve 46, and then the probe holes in the sleeve 46 and tube 50 aligned. In order to probe this splice, the snap ring 56 may be removed and the test prod inserted, and this enables a larger size prod to be used. The size of the prod is merely limited by the diameter of the probe holes 47 and 48 on the sleeve 46. When it is desired to reseal the probe hole 47, the snap ring 56 has its plug 58 inserted in the hole and has its arms respectively wrapped around the insulating sleeve 46.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:

1. An electrical connector comprising: a conductive tube; an insulating tube, external and coaxial to said conductive tube and extending longitudinally beyond said conductive tube at both ends thereof; a hole in the wall of said insulating tube; a hole in the wall of said conductive tube; said holes having at least a portion of each hole disposed in overlapping relation to provide access to a portion of said conductive tube underlying said holes; and a solid, resilient, insulating means to seal said hole in said insulating tube.

2. An electrical connector according to claim 1 wherein said solid, resilient, insulating means is removable.

3. An electrical connector comprising: a conductive tube; an insulating tube, external and coaxial to said conductive tube and extending longitudinally beyond said conductive tube at both ends thereof; a hole in the wall of said insulating tube; a portion of said conductive tube underlying a portion of said hole; and a solid, insulating means to seal said hole including a plug portion for disposition within said hole and a holding portion formed to grip said insulating tube.

4. An electrical connector comprising: a conductive tube; an insulating tube, external and coaxial to said conductive tube and extending longitudinally beyond said conductive tube at both ends thereof; a hole in said insulating tube; a portion of said conductive tube underlying a portion of said hole; and a solid insulating means to seal said hole disposed between said conductive and insulating tubes.

References Cited in the file of this patent

UNITED STATES PATENTS

| | | |
|---|---|---|
| 2,296,227 | Varga | Sept. 15, 1942 |
| 2,478,082 | Broske | Aug. 2, 1949 |
| 2,766,614 | Cook | Oct. 16, 1956 |
| 2,774,810 | Ritter | Dec. 18, 1956 |
| 2,828,353 | Adams et al. | Mar. 25, 1958 |
| 2,852,631 | White | Sept. 16, 1958 |

FOREIGN PATENTS

| | | |
|---|---|---|
| 780,702 | Great Britain | Aug. 7, 1957 |